United States Patent
Walker et al.

(10) Patent No.: US 6,658,390 B1
(45) Date of Patent: Dec. 2, 2003

(54) SYSTEM AND METHOD FOR RESELLING A PREVIOUSLY SOLD PRODUCT

(75) Inventors: Jay S. Walker, Ridgefield, CT (US); Daniel E. Tedesco, New Canaan, CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 09/260,439

(22) Filed: Mar. 2, 1999

(51) Int. Cl.$^7$ .............................................. G06F 17/60
(52) U.S. Cl. ............................. 705/5; 705/15; 705/26; 705/35; 705/34
(58) Field of Search .............................. 705/5, 26, 37, 705/15, 35

(56) References Cited

U.S. PATENT DOCUMENTS

| | | |
|---|---|---|
| 5,253,165 A | 10/1993 | Leiseca et al. |
| 5,270,921 A | 12/1993 | Hornick ........................ 364/407 |
| 5,644,721 A | 7/1997 | Chung et al. ................ 395/206 |
| 5,797,127 A | 8/1998 | Walker et al. .................. 705/5 |
| 5,832,451 A | 11/1998 | Flake et al. ..................... 705/5 |
| 5,842,176 A | 11/1998 | Hunt et al. |
| 5,864,818 A | 1/1999 | Feldman ......................... 705/5 |
| 5,913,210 A | 6/1999 | Call ............................... 707/4 |
| 6,067,532 A * | 5/2000 | Gebb ........................... 705/37 |
| 6,085,169 A * | 7/2000 | Walker et al. |
| 6,107,932 A | 8/2000 | Walker et al. .......... 340/825.31 |

FOREIGN PATENT DOCUMENTS

| | | |
|---|---|---|
| WO | WO 96/34356 | 10/1996 |
| WO | WO 99/60489 | 11/1999 |

OTHER PUBLICATIONS

Fly Rights A Consumer Guide to Air Travel, Consumer Information Center, Tenth Edition, Sep. 1994.*
Merriam Webster's Collegiate Dictionary, Tenth Edition, 1996, p. 1173.*
Fannie Mae/Freddie Mac Uniform Instrument for Virginia—Single Family Form 3047 Amended May 1991.*
The Authoritative Dictionary of IEEE Standards Terms, Seventh Edition, 2000, p. 725.*
"Carriers Move to Counter Skytrain", Aviation Week and Space Technology, Aug. 8, 1977 at p. 27.
"Right of Redemption", Black's Law Dictionary, West Publishing Co., 1990.
"Virgin Atlantic Changes Standby to Same–Day Fare", Aviation Daily, May 18, 1992 at p. 293.
"Lufthansa Chief Plots Turnaround Strategy", Aviation Week nad Space Technology, Mar. 8, 1993 at p. 40.
John M. Feldman, "Getting Serious on Pricing", Air Transport World, Oct. 1994 at p. 56.
Matthew C. Snow, "New Reservation System Takes Flight at Air France", Datamation, Apr. 1997 at p. 18.
Katie Fairbank, "There's Little Room in the Air This Summer as Carriers Fill Up Planes", The Associated Press, Jul. 14, 1997.
Joan M. Feldman, "Pricing and Cybersales; Internet Airline Ticket Sales and Reservations," Air Transport World, Feb. 1998 at p. 64.
PCT International Preliminary Examination Report for Application No. PCT/US00/03519, dated May 1, 2001.

* cited by examiner

Primary Examiner—Robert P. Olszewski
Assistant Examiner—Jennifer I Harle
(74) Attorney, Agent, or Firm—Michael D. Downs; Dean P. Alderucci

(57) ABSTRACT

A seller, having previously sold a product to an original purchaser subject to a buyout-provision condition, determines if the buyout-provision condition is satisfied. If the buy-out provision condition is satisfied, the seller retakes the product from the original purchaser and resells the product to a subsequent purchaser.

18 Claims, 8 Drawing Sheets

| FLIGHT IDENTIFIER 510 | FLIGHT CHARACTERISTICS 520 | SEAT TYPE 530 | SEAT NUMBER 540 | AVAILABILITY 550 | RETAIL PRICE 560 | DEMAND FORECAST 570 | CURRENT DEMAND 580 |
|---|---|---|---|---|---|---|---|
| AB123 | JFK-LAX DEPART 8AM 10/19/98 | 1ST CLASS | 24 | 0 | $339.00 | 90% | 90% |
|  |  | COACH | 12 | 0 | $300.00 | 90% | 110% |
| AB125 | LGA-LAX DEPART 8AM 10/20/98 | 1ST CLASS | 29 | 1 | $380.00 | 95% | 93% |
|  |  | COACH | 14 | 0 | $350.00 | 95% | 93% |
|  |  | COACH | 15 | 1 | $350.00 | 95% | 93% |

FIG. 3

| CUSTOMER IDENTIFIER 610 | PRODUCT PURCHASED 620 | ORIGINAL PURCHASE PRICE 630 | BUYOUT PROVISION 640 | REFUND 650 | STATUS 660 | CONTACT INFORMATION 670 |
|---|---|---|---|---|---|---|
| 1111-1111-1111-1111 | AB123 / 24 | $399.00 | OWNER-DISCRETION | ORIGINAL PURCHASE PRICE | EXERCISED/ VOID | BOBBY@ AOL.COM |
| 2222-2222-2222-2222 | AB123 / 12 | $250.00 | SELLER-DISCRETION | (SUBSEQUENT PURCHASE PRICE) x 0.5 | NOT EXERCISED | (203) 555-1212 |
| 3333-3333-3333-3333 | AB125 / 14 | $350.00 | SELLER-DISCRETION | SUBSTITUTE PRODUCT | NOT EXERCISED | PROF@ SCHOOL.EDU |
| 4444-4444-4444-4444 | AB125 / 17 | $350.00 | N/A | N/A | N/A | (212) 111-1111 |

SYSTEM AND METHOD FOR RESELLING A PREVIOUSLY SOLD PRODUCT

The present invention relates to the sale of products. In particular, the present invention relates to a system and method for reselling a previously sold product.

BACKGROUND OF THE INVENTION

In general, markets efficiently "clear" a seller's supply of a given product at a price reflective of buyer demand at a particular point in time. When demand is high, the seller can charge a high price for the product. When demand is low, on the other hand, the seller must accept a lower price for the product.

Demand for the product, however, may increase after the seller's supply has been cleared at a low price, resulting in a missed opportunity for profit. Consider, by way of example, the case of an airline selling airline tickets. All of the tickets for a particular flight may have been sold months in advance for $100 each. At the last minute, however, a surge in demand may result in potential customers offering $200 for a ticket on that flight. At this point, the seller can do nothing to profit from the increased demand.

This consequence is caused by the seller's inability to take back a previously sold product and then resell it at the higher price. That is, after the product has been sold, the seller is not typically able to rescind the transaction simply because demand for the product increases.

Because sales are generally not rescindable, the seller is forced to make pricing and inventory decisions that are, at best, speculative. In the airline industry, two practices have been employed to make optimal decisions for the seller. The first practice, called "revenue management," involves the dynamic adjustment of price according to real-time readings of supply, demand, competitive factors and historical purchase trends. The second practice, called "demand forecasting," involves analysis of historical and projected factors that effect sales, including prior sales, weather patterns and the like. Even when both of these concepts are used so that price is a demand forecast factor and demand forecast data effects price, the predictions still have an inherent margin of error, resulting in lost revenue opportunities.

Another problem with known methods of selling products is that purchasers cannot take advantage of an increase in demand. The ticket holder discussed above is not likely to be aware that potential customers are willing to pay $200 for the ticket he or she has already purchased for $100. A potential customer who is willing to pay more for a product that is no longer available from the seller currently has no simple way to communicate with, for example, ticket holders. Known methods of contacting ticket holders, such as through a newspaper advertisement, are not very effective and incur additional costs, such as the price of the advertisement.

Thus, a need exists for a system and method that enables sellers, such as airlines, to capitalize on demand identified after a sale when the value of that demand surpasses the value of the demand realized at the time of the sale.

U.S. Pat. No. 5,253,165 to Leiseca et al. is directed to a computerized reservation and scheduling system that lets consumers negotiate for, and select from, pre-scheduled transportation services. The Leiseca patent does not address how a transportation provider could resell a previously-sold transportation product.

Similarly, PCT International Publication Number WO 96/34356 (the "WO '356 reference") discloses that consumers can use posting terminals to communicate with a market maker computer to create a computerized market for previously sold goods. The WO '356 reference does not disclose that a product, previously sold, can be resold.

SUMMARY OF THE INVENTION

To alleviate the problems inherent in the prior art, the present invention introduces systems and methods for reselling a previously sold product.

Many ticket holders would be happy to re-arrange travel plans in return for, by way of example, an economic inducement. In the airline example from above, a ticket holder may be happy to accept a ticket for a different date and a $50 coupon in return for giving up a seat. In this case, the airline could still earn an extra $50 profit ($200 received from the subsequent purchaser—$100 cost of the replacement ticket—$50 paid to the original purchaser).

In one embodiment of the present invention, a seller, having previously sold a product to an original purchaser subject to a buyout-provision, determines if the buyout-condition is satisfied. If the buyout condition is satisfied, the seller recalls the product from the original purchaser and resells the product to a subsequent purchaser.

With these and other advantages and features of the invention that will become apparent, the nature of the invention may be more clearly understood by reference to the following detailed description of the invention, the appended claims, and to the several drawings attached herein.

BRIEF DESCRIPTION OF THE DRAWINGS

FIG. 3 is a tabular representation of a portion of the inventory database shown in FIG. 2 according to an embodiment of the present invention.

FIG. 4 is a tabular representation of a portion of the original purchaser database shown in FIG. 2 according to an embodiment of the present invention.

DETAILED DESCRIPTION

Figure 1:
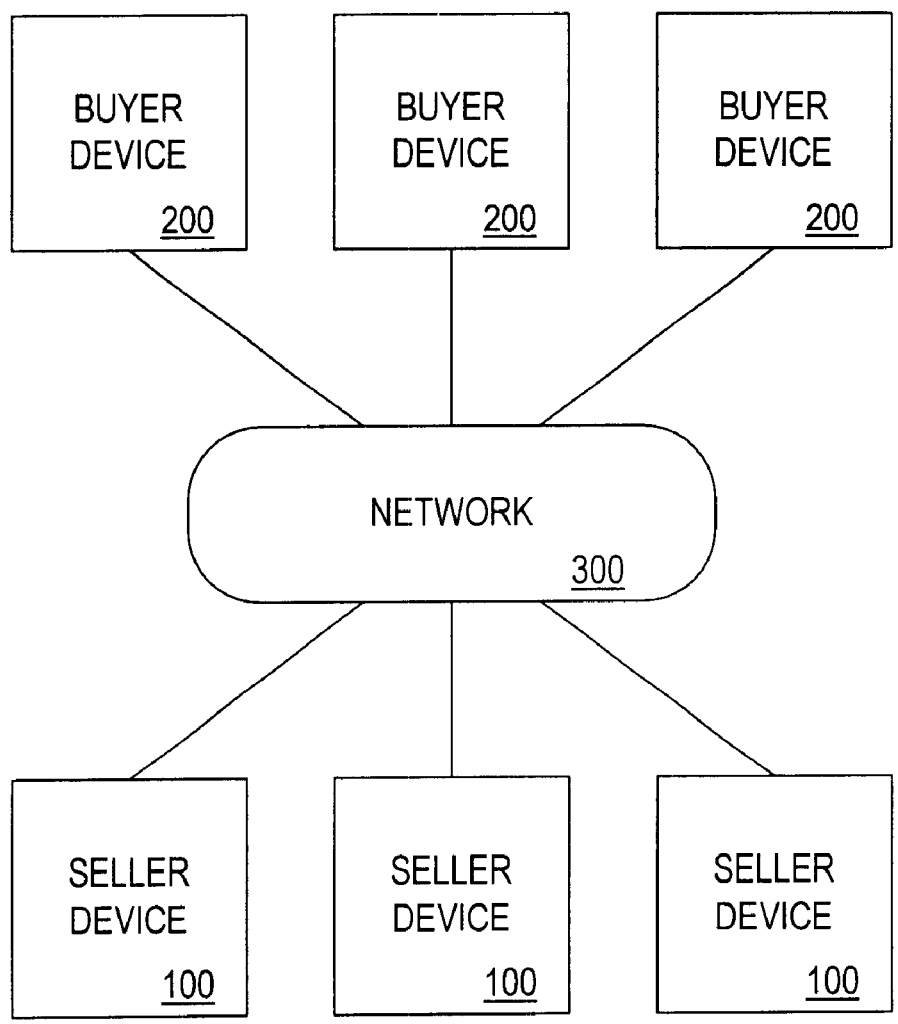
FIG. 1 is a block diagram overview of a system for reselling a previously sold product according to an embodiment of the present invention.

The present invention is directed to systems and methods for reselling a previously sold product. Turning now in detail to the drawings, FIG. 1 is a block diagram overview of a system for reselling a previously sold product according to an embodiment of the present invention. The system includes a number of seller devices 100 coupled to a number of buyer devices 200 through a communication network 300. The buyer devices 200 may be, for example, Personal Computers (PCs), Personal Digital Assistants (PDAs), wired or wireless telephones, or any other communication device. The communication network 300 may be, for example, a Local Area Network (LAN), a wireless network, a Public Switched Telephone Network (PSTN), or an Internet Protocol (IP) network such as the Internet, an intranet or an extranet. By way of example only the seller device may be a Web-based server communicating with a number of PCs through the Internet.

According to an embodiment of the present invention, a seller using a seller device 100 resells a "product" previously sold to an original purchaser. As used herein, the product may be any good or service provided by the seller. The product may also be the right to use a service provided by the seller, as in the case of an airline ticket. Other types of products include hotel rooms, car rental services, concert and other event tickets, and consumer electronic devices. When the seller initially sells the product to an original purchaser, the sale is made subject to a "buyout provision." That is, the original purchaser agrees, at the time of the original sale, that the seller has the right to recall the product at a later point in time. According to another embodiment of the present invention, the original purchaser is informed that the seller may offer to recall the product at a later point in time, subject to the original purchaser's acceptance of a buyout offer. The buyout-condition may be, for example, associated with a subsequent offer for the product from a subsequent purchaser, perhaps at a level of compensation above a threshold compensation level. For example, if an airline ticket was sold to the original purchaser for $500, the buyout-condition may be associated with the airline receiving a subsequent offer of $550 for a ticket on that flight. According to another embodiment of the present invention, the buyout-condition may instead be triggered when product inventory falls below a threshold inventory level. Of course, many different factors, and combinations of factors, may be used to create a buyout provision.

To encourage customers to accept buyout-provisions, the seller may offer, for example, a discounted original purchase price, a promise that any recalling will only be performed if the original purchaser accepts a buyout offer, a promise of a discount on a future purchase, or a predetermined minimum compensation to be provided if the recalling is performed. The predetermined minimum compensation may be, for example, a minimum refund, a minimum substitute product, or a promised minimum discount on a future purchase. According to one embodiment of the present invention, a customer may choose between a number of different buyout-provisions, each having a different set of inducements. For example, more encouragement may be given to customers willing to be the first ones to relinquish (to be "bumped"). Likewise, each customer may be allowed to set his or her own "threshold," as in: "I am willing to be 'bumped' if I receive $100 back in addition to the price I paid for the ticket."

According to an embodiment of the present invention, after the original sale, the seller device 100 determines if the buyout-condition is satisfied. The determination may include the evaluation of, for example, an actual or estimated product inventory, an actual or estimated demand for the product, or an actual or estimated profit if the product is resold. The determination whether the buyout-condition is satisfied may be performed either periodically or upon a change in a variable associated with the buyout-provision. According to another embodiment of the present invention, the determination may be "automatically" performed by the seller device 100. As used herein, the terms "automatic" and "automatically" refer to actions that are not performed in an entirely manual way. According to another embodiment of the present invention, the determination may be made manually, on an ad hoc basis, by an operator of the system. According to still another embodiment of the present invention, the determination may be "dynamically" performed by the seller device 100. As used herein, the terms "dynamic" and "dynamically" refer to actions that are performed substantially in real-time.

A determination whether the buyout-condition is satisfied may also include an evaluation of the profit that will be made by the seller if the product is resold. For example, consider a product that was previously sold at an original purchase price and may be resold at a subsequent purchase price. In this case, the seller may decide to recall the product only if the subsequent purchase price is greater than the original purchase price. In another example, a buyout-provision condition may only be satisfied if subsequent purchase price>price of substitute product. The determination may also include evaluating information in, for example, an inventory database, an original purchaser database, or a buyout-provision condition database. In the case of an airline, a subsequent purchaser may be asked to redeem frequent flier miles in order to "bump" the original purchaser. If the buyout-condition is satisfied, the seller recalls the product from the original purchaser. According to one embodiment of the present invention, depending on the terms of the original sale, the seller may have the right to recall the product with the consent of the original purchaser. Recalling the product includes either (i) taking the product from the original customer, or (ii) voiding the original customer's product. According to another embodiment of the present invention, the seller may instead provide a "buyout offer" to the original purchaser when the buyout-condition is satisfied. In this case, the product is not recalled unless the original purchaser accepts the buyout offer. The buyout offer may include, for example, an offer of a refund, a substitute product, or a promise of a discount on a future purchase. For example, an airline may provide a ticket holder with a buyout offer including a substitute ticket on an alternate flight, along with a number of bonus frequent flier miles, in return for giving up a ticket.

The buyout offer may be sent from the seller device 100 to the buyer device 200 through the communication network 300. The buyout offer may also be sent to a number of different buyers. For example, the seller device 100 may send an e-mail to a number of ticket holders. In this case, the first ticket holder to accept the offer may terminate the offer with respect to the other ticket holders. According to another embodiment of the present invention, a particular buyout offer may be sent to a subset of all possible ticket holders, perhaps based on a ticket holder's frequent flier status or the price the ticket holder paid for the ticket. Likewise, different buyout offers with different terms, such as different offers of compensation, may be sent to different subsets of ticket holders.

When the seller recalls the product from the original purchaser, the seller may compensate the original purchaser, such as by providing a refund or substitute product, or the compensation may be provided at a later time. After the seller retakes the product from the original purchaser, the product can then be resold to a subsequent purchaser. According to another embodiment of the present invention, this may be done by transferring the product directly from the original purchaser to the subsequent purchaser.

According to still another embodiment of the present invention, information about a product recalling and reselling may be stored in a database, such as a product resale database, to help set, for example, buyout-conditions and buyout offers in the future. The information may include, for example, a compensation received by the original purchaser (including any promise or minimum compensation provided to the original purchaser in exchange for having the original sale subject to the buyout-condition). The information may also include a buyout offer that was accepted by the original purchaser (including any refund, substitute product, promise of a discount on a future purchase, or other compensation included in the buyout offer), a compensation provided to the original purchaser in exchange for recalling the product, a compensation received from the subsequent purchaser, or how the buyout-condition was satisfied.

Figure 2:
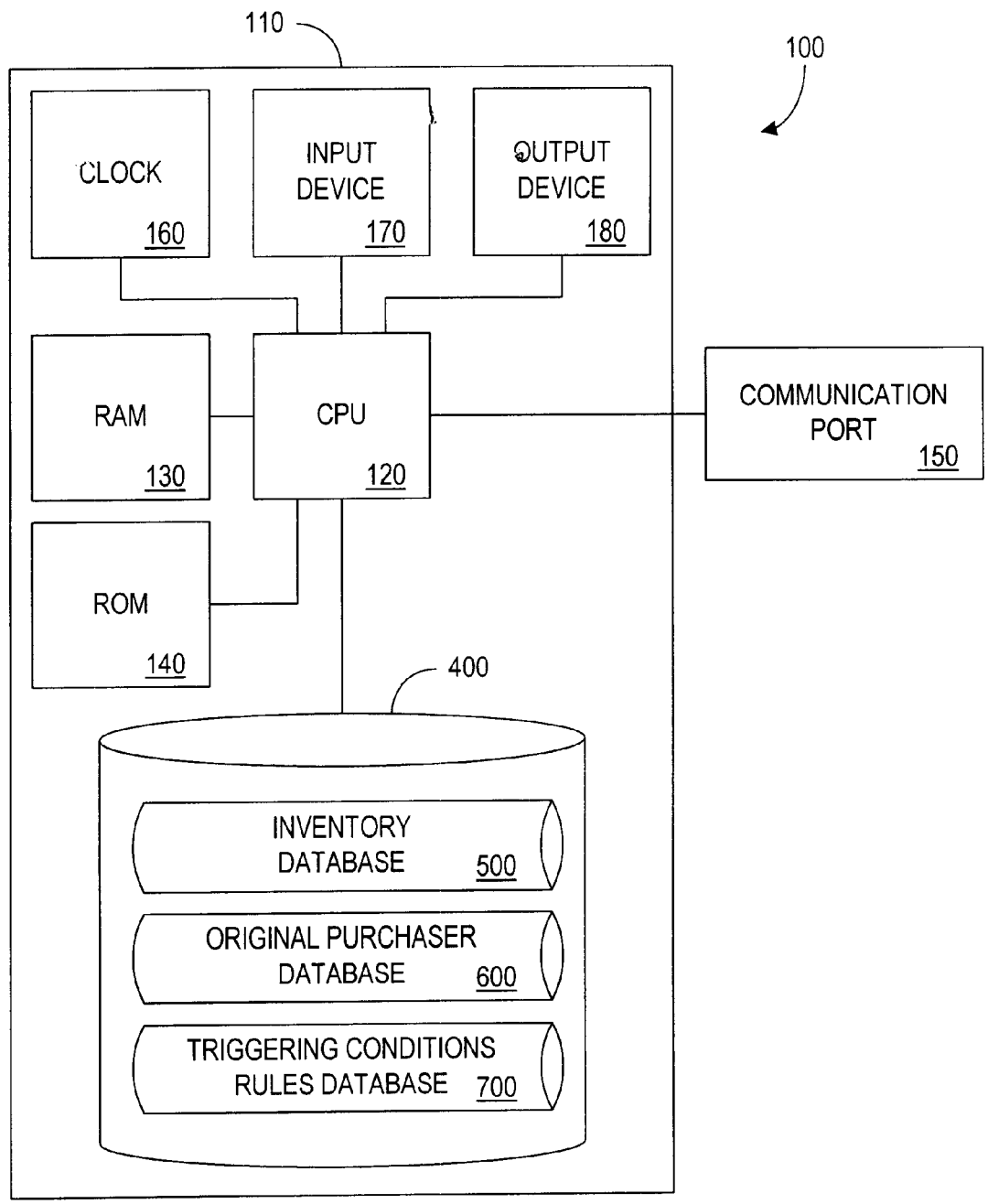
FIG. 2 is a block schematic diagram of the seller device shown in FIG. 1 according to an embodiment of the present invention.

FIG. 2 is a block schematic diagram of the seller device 100 shown in FIG. 1 according to an embodiment of the present invention. The seller device 100 includes a processing module 110 with a Central Processing Unit (CPU) 120 coupled to: a clock 160; a network communication port 150, which in turn is coupled to a network (not shown in FIG. 2); and "memories" comprising a Random Access Memory (RAM) 130 and a Read Only Memory (ROM) 140 and a storage device 400. An input device 170 and an output device 180 are also coupled to the CPU 120.

The memories 130, 140 and 400 may store instructions adapted to be executed by the CPU 120 to perform at least one embodiment of the present invention. For example, when a seller has previously sold a product to an original purchaser subject to a buyout-provision, the memories 130, 140 and 400 may store instructions adapted to be executed by the CPU 120 to determine if the buyout-condition is satisfied. If the buyout-condition is satisfied, the CPU 120 may the recalling of the product from the original purchaser and the reselling of the product to a subsequent purchaser.

For the purposes of this application, the memories 130, 140 and 400 could include any medium capable of storing information and instructions adapted to be executed by a processor. Some examples of such media include, but are not limited to, floppy disks, CD-ROM, magnetic tape, hard drives, and any other device that can store digital information. In one embodiment, instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

As shown in FIG. 2, the storage device 400 contains an inventory database 500, described in detail with respect to FIG. 3. The storage device 400 also contains an original purchaser database 600, described in detail with respect to FIG. 4, and a triggering conditions rules database 700, described in detail with respect to FIG. 5. According to an embodiment of the present invention directed to reselling airline tickets, the storage device 400 may also contain, for example, a database (not shown in FIG. 2) that stores prior sales data for specific seats. This data may be used to make future pricing decisions, such as revenue management decisions, and to set optimal triggering conditions for buyout-provisions.

FIG. 3 is a tabular representation of a portion of the inventory database 500 shown in FIG. 2 according to an embodiment of the present invention directed to reselling airline tickets. As shown in FIG. 3, the inventory database 500 has multiple data categories. For example, the inventory database 500 may include a flight identifier 510, flight characteristics 520, a seat type 530, a seat number 540, an availability 550, a retail price 560, a demand forecast 570, and a current demand 580.

FIG. 4 is a tabular representation of a portion of the original purchaser database 600 shown in FIG. 2 according to an embodiment of the present invention directed to reselling airline tickets. The original purchaser database 600 may be used to store all original purchasers who have previously agreed to either automatically relinquish or be provided with refund offers. As shown in FIG. 4, the original purchaser database 600 may include a customer identifier (such as a credit card number) 610, a product purchased (such as a flight number and seat number) 620, an original purchase price 630, a buyout provision 640, a refund 650, a status 660, and contact information 670. The contact information 670 may be, for example, an e-mail address or a telephone number that can be used to send a buyout offer to an original purchaser.

Note that the buyout-provision 640 stored in the original purchaser database 600 may indicate that the buyout-provision is "owner-discretion." In this case, the original purchaser may be notified and asked if he would like to relinquish his ticket. This decision may be based on the amount of pecuniary refund that is offered to the original purchaser. For example, a subsequent purchaser may submit an irrevocable Conditional Purchase Offer (CPO), as defined, for example, in U.S. Pat. No. 5,794,207 to Walker et al., the entire contents of which are hereby incorporated by reference. Such a CPO could specify an offer to purchase a ticket at a price 25% higher than the original purchaser paid. This makes it possible for the original purchaser to profit from the recalling. The original purchaser's decision may also be based on his or her ability to get a similar alternate flight. For example, the original purchaser who purchased a coach ticket to a particular city may be willing to relinquish that coach ticket for a first class ticket to a nearby city.

The buyout-provision 640 may also indicate that the buyout-provision is "seller-discretion." In this case, the airline may void, recall and/or transfer a ticket sold to an original purchaser without owner consent. The original purchaser may have, for example, received a substantial discount in order to accept the possibility that he or she would later relinquish his or her place on the flight. The original purchaser database 600 may also store conventional ticket sales (i.e., sales that are not subject to a buyout-provision), in which case the buyout-provision 640 may simply indicate "n/a." Likewise, a conventional ticket sales database (not shown in FIG. 4) can be modified to handle information used in accordance with various embodiments of the present invention.

The status information 660 stored in the original purchaser database 600 may indicate that the buyout offer has been accepted, or "exercised," and that the ticket issued to the original purchaser is now "void." Such information might prevent an airline from over-redeeming buyout offers.

Figure 5:
FIG. 5 is a tabular representation of a portion of the triggering conditions rules database shown in FIG. 2 according to an embodiment of the present invention.

FIG. 5 is a tabular representation of a portion of the triggering conditions rules database 700 shown in FIG. 2 according to an embodiment of the present invention directed to reselling airline tickets. As shown in FIG. 5, the triggering conditions rules database 700 may include a product purchased 710 and a set of triggering conditions 720. The "X" used in the product purchased 710 indicates a seat number in a series. That is, "1X" represents seats 10 through 19, which may be, for example, first class seats. The set of triggering conditions 720 may include, for example, a requirement that a "subsequent purchaser [is] identified."

This may be satisfied directly or indirectly through the receipt of a simple price inquiry or a ticket request from a subsequent purchaser via telephone, an e-mail, a Web page or a system operator. A subsequent purchaser may instead submit an offer, such as an irrevocable CPO, to the system indicating his willingness to purchase a product similar to the original purchaser's product for a buyer-defined price.

Figure 6:
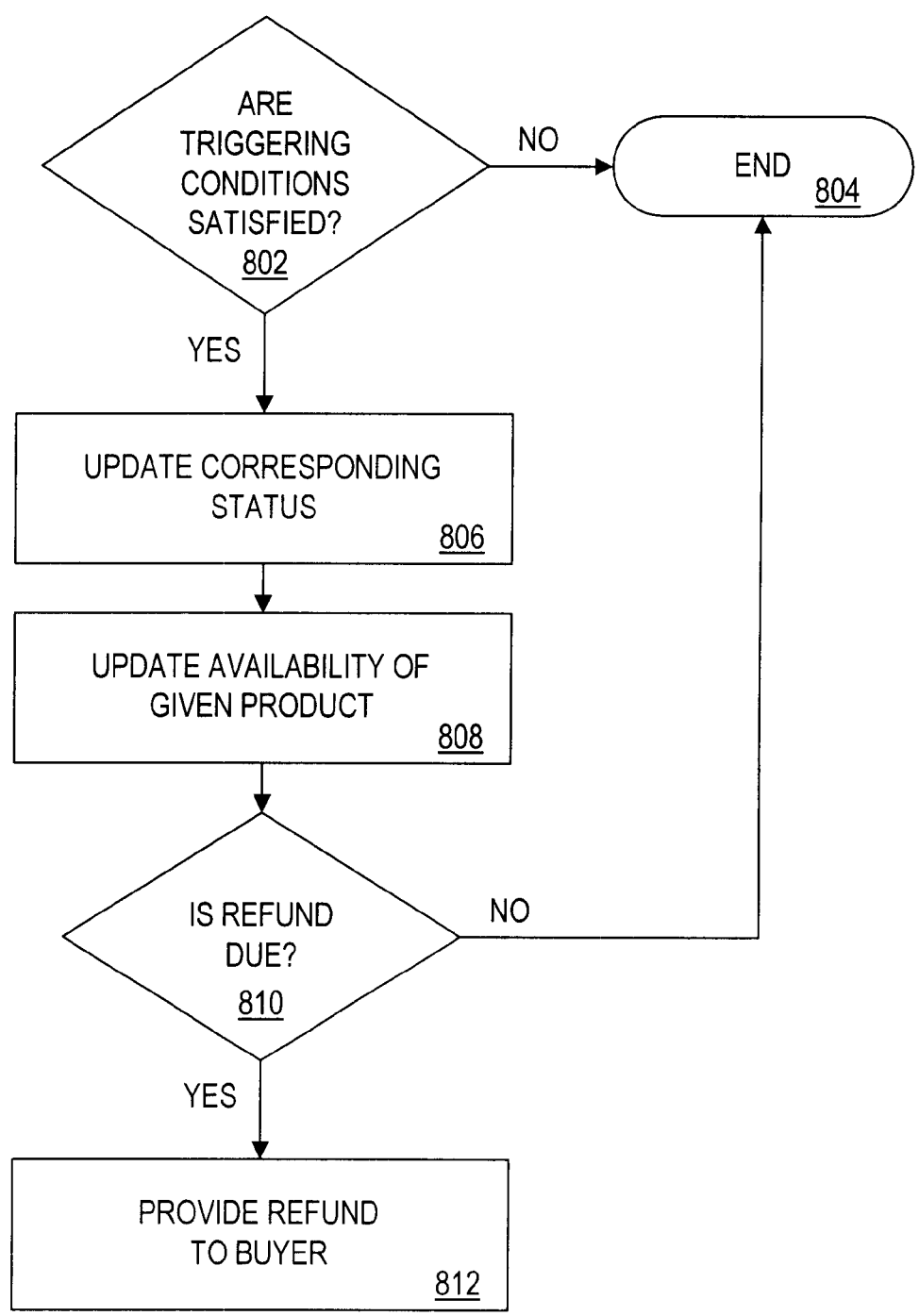
FIG. 6 is a flow chart illustrating a method of reselling a previously sold product at the seller's discretion according to an embodiment of the present invention.

FIG. 6 is a flow chart illustrating a method of reselling a previously sold product at the seller's discretion according to an embodiment of the present invention. The flow chart in FIG. 6, as well as the other flow charts discussed herein, are not meant to imply a fixed order to the steps; an embodiment of the present invention can be practiced in any order that is practicable. The process may be executed periodically, continuously, or upon a change in a triggering condition, such as a change in demand, as described with respect to FIG. 5.

As shown in FIG. 6, at step 802 it is determined, for a given product, if requisite triggering conditions are satisfied. For example, it may be determined if (1) a subsequent purchaser has been identified, (2) there is no comparable seat available for the subsequent purchaser, (3) there is a suitable alternative available for the original purchaser or (4) actual demand is higher than the forecast demand. If the triggering condition is not satisfied at step 802, the process ends at step 804.

If the triggering condition is satisfied at step 802, the corresponding status 660 in the original purchaser database 600 is updated to "exercised/void" at step 806. At step 808, the availability 550 of the product is updated in the inventory database 500. For example, where the triggering condition is simply an increase in demand, the availability 550 may be increased from "0" to "1" to open up more supply to meet the increased demand. If the triggering condition is an identified subsequent purchaser, the availability 550 may not be updated, and the newly available ticket may be transferred directly to the identified subsequent purchaser.

If no refund is due to the original purchase at step 812, the process ends at step 804. If a refund is due to the original purchaser at step 812, the refund, such as a substitute ticket, is provided to the original purchaser at step 812 before the process ends at step 804.

Figure 7A:
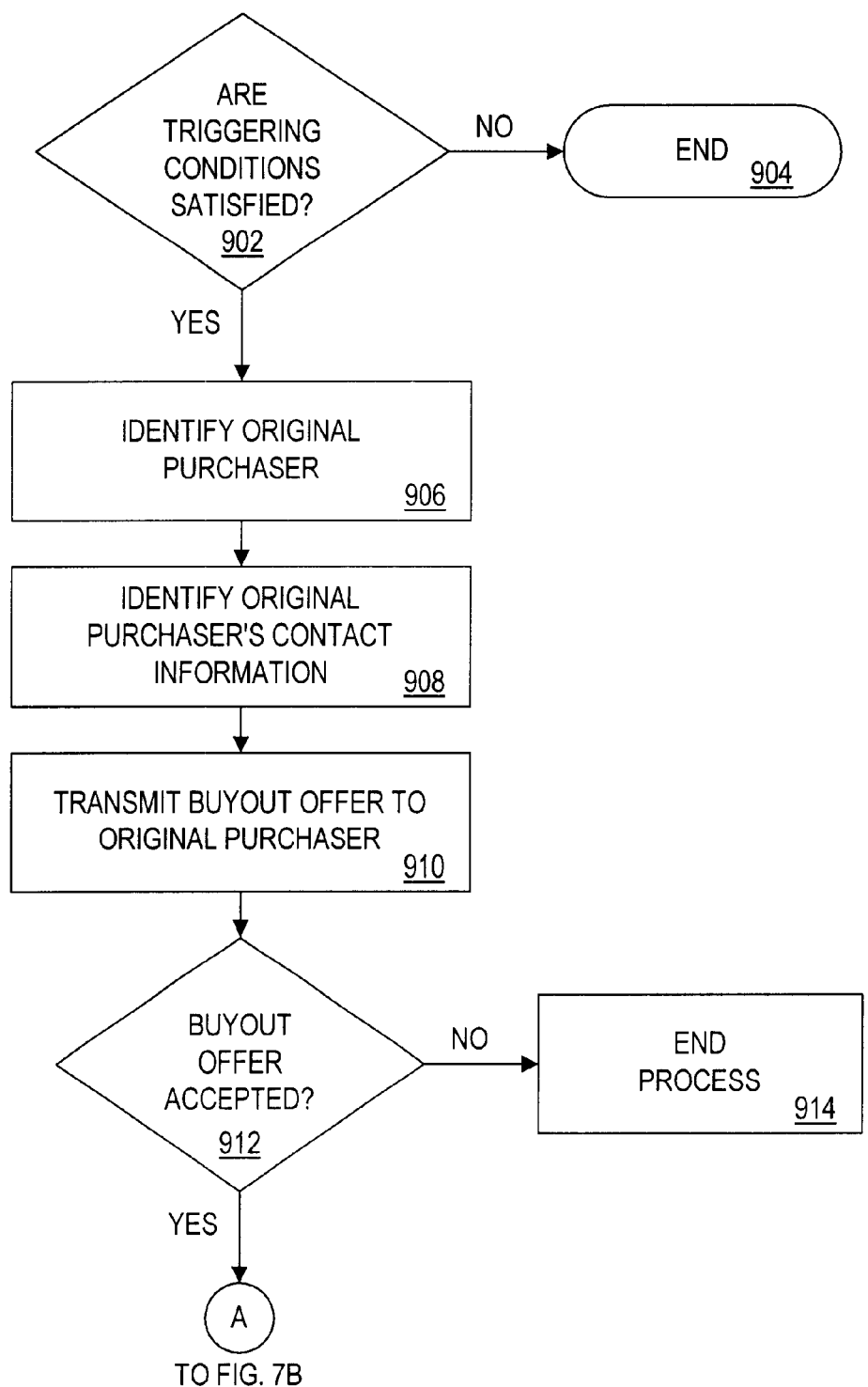
FIGS. 7A and 7B are a flow chart illustrating a method of reselling a previously sold product at the original purchaser's discretion according to an embodiment of the present invention.
Figure 7B:
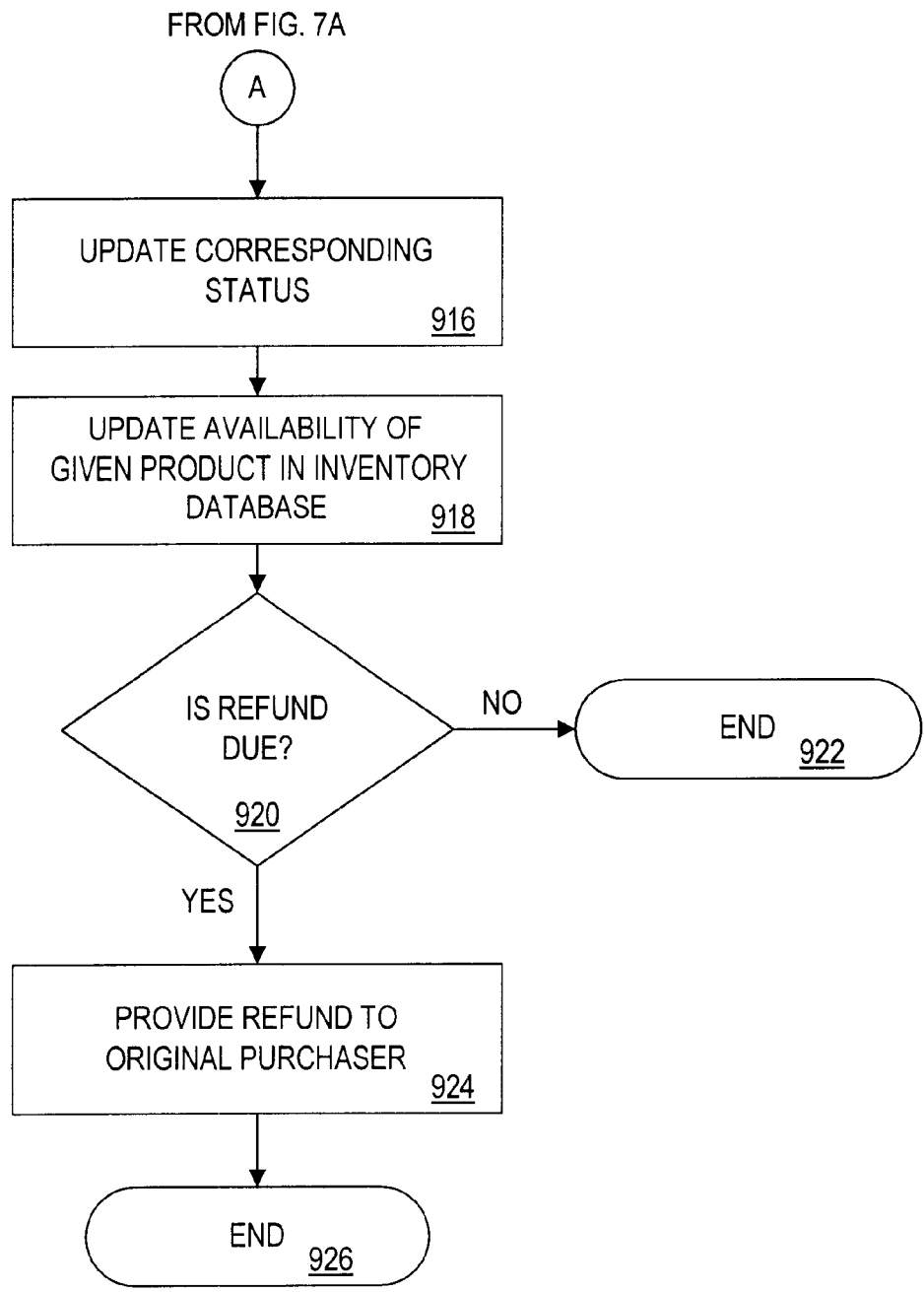

FIGS. 7A and 7B is flow chart illustrating a method of reselling a previously sold product at the original purchaser's discretion according to an embodiment of the present invention. As shown in FIG. 7A, at step 902 it is determined, for a given product, if requisite triggering conditions are satisfied. If the triggering conditions are not satisfied, the process ends at step 904.

If the triggering conditions are satisfied, the original purchaser of the product is identified at step 906 using the original purchaser database 600. At step 908, the original purchaser's contact information 670 is retrieved and a buyout offer is transmitted to the original purchaser at step 910. If the original purchaser declines the buyout offer at step 912, the process ends at step 914.

If the original purchaser accepts the buyout offer at step 912, the process continues as shown in FIG. 7B. At step 916, the corresponding status 660 in the original purchaser database 600 is updated to "exercised/void". At step 918, the availability 550 of the product is updated in the inventory database 500. If no refund is due to the original purchase at step 920, the process ends at step 922. If a refund is due to the original purchaser at step 920, the refund, such substitute ticket, is provided to the original purchaser at step 924 before the process ends at step 926.

Thus, the present invention enables a product, previously sold to an original purchaser subject to a buyout-provision to be resold to a subsequent purchaser. Such an arrangement can benefit both a seller and the original purchaser, who may now profit from the resale. The present invention can also benefit the subsequent purchaser, who may purchase a product that would not otherwise be available.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for reselling a product, comprising:
   selling a product to a first purchaser at a first price;
   determining that the product can be resold at a second price that is higher than the first price;
   responsive to the determining step, recalling the product from the first purchaser; and
   reselling the recalled product to a second purchaser at the second price, in which the product includes at least one of an airline ticket and a hotel room reservation.

2. The method of claim 1, wherein the determining step includes receiving an offer to buy the product at a second price.

3. The method of claim 1, wherein the determining step includes evaluating at least one of (i) an actual product inventory; (ii) an estimated product inventory; (iii) an actual demand for the product; and (iv) an estimated demand for the product.

4. The method of claim 1, further comprising:
   providing a buyout offer to the first purchaser;
   wherein the recalling and reselling steps are performed only if the first purchaser accepts the buyout offer.

5. The method of claim 4, wherein the buyout offer includes an offer of at least one of (i) a refund; (ii) a substitute product; and (iii) a promise of a discount on a future purchase.

6. The method of claim 4, wherein the providing step includes sending the buyout offer to the first purchaser through a communication network.

7. The method of claim 1, wherein the recalling step is performed without providing a buyout offer to the first purchaser.

8. The method of claim 1, wherein the recalling step includes providing compensation to the first purchaser.

9. The method of claim 8, wherein the compensation provided to the first purchaser includes at least one of (i) a refund and (ii) a substitute product.

10. The method of claim 1, further comprising:
    requesting, at the time the product was sold to the first purchaser, that the product be subject to recall.

11. The method of claim 10, wherein the requesting step includes offering the first purchaser at least one of (i) a discounted original purchase price; (ii) a promise that recalling will only be performed if the first purchaser accepts a buyout offer; (iii) a promise of a discount on a future purchase; and (iv) a minimum compensation to be provided if recalling is performed.

12. The method of claim 11, wherein the minimum compensation includes at least one of (i) a minimum refund; (ii) a minimum substitute product; and (iii) a promised minimum discount on a future purchase.

13. The method of claim 1, wherein the recalling and reselling steps include transferring the product directly from the first purchaser to the second purchaser.

14. A method for reselling an airline ticket, comprising:

selling the airline ticket to a first purchaser at a first price;

determining that the airline ticket can be resold at a second price that is higher than the first price, wherein the determining includes evaluating at least one of (i) an actual or estimated airline ticket inventory; (ii) an actual or estimated demand for the airline ticket; and (iii) whether an offer to purchase the sold airline ticket is received from a party other than the first purchaser;

responsive to the determining step, recalling the airline ticket from the first purchaser;

providing compensation to the first purchaser, the compensation including at least one of (i) a refund; (ii) a substitute airline ticket; and (iii) other compensation related to the airline ticket; and reselling the airline ticket to a second purchaser at the second price.

15. The method of claim 14, further comprising the step, performed responsive to the determining step, of obtaining consent from the first purchaser to the recalling of the airline ticket.

16. The method of claim 14, wherein the recalling and reselling steps include transferring the airline ticket directly from the first purchaser to the second purchaser.

17. An apparatus comprising:

a processor; and a memory storing instructions adapted to be executed by the processor, the instructions for directing the processor to perform a method comprising selling a product to a first purchaser at a first price;

determining that the product can be resold at a second price that is higher than the first price;

responsive to the determining step, recalling the product from the first purchaser; and reselling the recalled product to a second purchaser at the second price, in which the product includes at least one of an airline ticket and a hotel room reservation.

18. An apparatus comprising:

a processor; and a memory storing instructions adapted to be executed by the processor, the instructions for directing the processor to perform a method comprising selling the airline ticket to a first purchaser at a first place;

determining that the airline ticket can be resold at a second price that is higher than the first price, wherein the determining includes evaluating at least one of (i) an actual or estimated airline ticket inventory; (ii) an actual or estimated demand for the airline ticket; and (iii) whether an offer to purchase the sold airline ticket is received from a party other than the first purchaser;

responsive to the determining step, recalling the airline ticket from the first purchaser;

providing compensation to the first purchaser, the compensation including at least one of (i) a refund; (ii) a substitute airline ticket; and (iii) other compensation related to the airline ticket; and reselling the airline ticket to a second purchaser at the second price.

* * * * *